(12) United States Patent
Eswaran et al.

(10) Patent No.: US 9,166,990 B2
(45) Date of Patent: Oct. 20, 2015

(54) DISTRIBUTED DENIAL-OF-SERVICE SIGNATURE TRANSMISSION

(75) Inventors: Anand Eswaran, Bangalore (IN); Srinivas Guntupalli, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 12/703,170

(22) Filed: Feb. 9, 2010

(65) Prior Publication Data

US 2010/0212005 A1    Aug. 19, 2010

(30) Foreign Application Priority Data

Feb. 9, 2009   (IN) .............................. 274/CHE/2009

(51) Int. Cl.
*H04L 29/06*    (2006.01)
*H04L 12/715*   (2013.01)

(52) U.S. Cl.
CPC ............ *H04L 63/1408* (2013.01); *H04L 45/04* (2013.01); *H04L 63/1458* (2013.01); *H04L 2463/141* (2013.01)

(58) Field of Classification Search
CPC ............ H04L 63/1416; H04L 63/1425; H04L 63/1433; H04L 63/1441; H04L 63/1458; H04L 43/028; H04L 45/04
See application file for complete search history.

(56) References Cited

U.S. PATENT DOCUMENTS

| | | | |
|---|---|---|---|
| 6,279,113 B1 * | 8/2001 | Vaidya .............................. | 726/23 |
| 6,725,377 B1 * | 4/2004 | Kouznetsov ..................... | 726/23 |
| 7,301,899 B2 | 11/2007 | Goldstone | |
| 7,330,908 B2 | 2/2008 | Jungck | |
| 7,773,596 B1 * | 8/2010 | Marques ........................ | 370/392 |
| 8,141,156 B1 * | 3/2012 | Mao et al. ........................ | 726/23 |
| 2002/0032793 A1 * | 3/2002 | Malan et al. ................... | 709/232 |
| 2007/0130619 A1 | 6/2007 | Reams, III | |
| 2007/0143852 A1 * | 6/2007 | Keanini et al. .................. | 726/25 |
| 2007/0166051 A1 * | 7/2007 | Sebayashi et al. ............. | 398/177 |
| 2008/0127324 A1 * | 5/2008 | Seo et al. ......................... | 726/13 |
| 2008/0267189 A1 * | 10/2008 | Li ................................. | 370/392 |

OTHER PUBLICATIONS

G. Koutepas, et al. "An adaptable inter-domain infrastructure against DoS attack", in Proc. of Int. Conf. on Advances in Infrastructure for e-Business, e-Education, e-Science, e-Medicine, and Mobile Technologies on the Internet, 2003.*

M. Glenn, "A Summary of DoS/DDoS Prevention, Monitoring and Mitigation Techniques in a Service Provider Environment," SANS Institute InfoSec Reading Room, Aug. 21, 2003.*

(Continued)

*Primary Examiner* — Robert Leung
(74) *Attorney, Agent, or Firm* — Thorpe North & Western, LLP (57) ABSTRACT

A system and method of transmitting a DDoS, or distributed denial of service, signature from an intra-network to an internet is presented. The method includes identifying a DDoS signature and employing an inter-domain routing protocol configured to enable-operational information to be exchanged between nodes. The DDoS signature is embedded as payload of the standards-compliant inter-domain routing protocol. The step of embedding occurs within a network. The embedded DDoS signature is then sent from the network to an internet node outside of the network. The method further includes applying the DDoS signature to enable the internet nodes to filter packets matching the DDoS signature.

19 Claims, 4 Drawing Sheets

(56) References Cited

OTHER PUBLICATIONS

Y. Chen, et al. "Collaborative Detection of DDoS Attacks over Multiple Network Domains," IEEE Transactions on Parallel and Distributed Systems, TPDS-0228-0806, Jun. 2007.*

J. Ioannidis, et al. "Implementing Pushback: Router-Based Defense Against DDoS Attacks," In Proceedings of Network and Distributed System Security Symposium, 2002.*

Cisco, "Border Gateway Protocol (BGP)," Internetworking Technology Overview, Chapter 35, Jun. 1999, Retrieved Jun. 21, 2012, Online: http://www.pulsewan.com/data101/pdfs/bgp.pdf.*

* cited by examiner

DISTRIBUTED DENIAL-OF-SERVICE SIGNATURE TRANSMISSION

This application claims priority to Indian patent application Number 274/CHE/2009 filed Feb. 9, 2009, which is incorporated by reference in its entirety for all purposes.

BACKGROUND

Denial of service attacks are attempts to prevent legitimate users from utilizing or gaining access to computing resources, such as network bandwidth, memory, and CPU bandwidth. Thus, denial of service attacks make a computer resource unavailable to its intended users. Although any shared computer resource could potentially be at risk, typical targets of such attacks include high-profile web servers or other networked servers.

A common method of attack is to saturate a victim machine with external communication requests (e.g., in quantity and time) sufficient to prevent the victim machine from responding to legitimate network traffic. At the very least, such an attack can slow the response time of the victim machine to legitimate traffic. General symptoms of a denial of service attack include unusually slow network performance, unavailability of a web site, a dramatic spike in the number of spam emails received, or inability to access a network device.

One particular type of denial of service attack is a distributed denial of service (or DDoS) attack. In a DDoS attack, multiple compromised systems, also known as hosts or zombies, flood the bandwidth or resources of a targeted system. Generally, the target of a DDoS attack is one or more web servers. Essentially, the greatest point of difference between a denial of service attack and a DDoS attack is the scale. A single perpetrator acting with a single host mounts a denial of service attack, whereas a single attacker utilizing hundreds or thousands of host or zombie systems can simultaneously mount individual denial of service attacks which together amount to a DDoS attack.

DETAILED DESCRIPTION OF EXAMPLE EMBODIMENTS

Reference will now be made to the exemplary embodiments illustrated, and specific language will be used herein to describe the same. It will nevertheless be understood that no limitation of the scope of the invention is thereby intended.

Distributed denial of service (or DDoS) attacks include a number of host or zombie machines which increases the complexity involved in identifying and fending off such an attack. By the very nature of DDoS attacks, however, websites and networks work to prevent and disable any such attacks or run the risk of falling prey to such detrimental attacks. Thus, the ability to quickly identify and react to DDoS attacks is of great importance to the electronic world. As such, disclosed herein is a method and system capable of automating at least part, and in some embodiments, an entire process of recognizing an attack and properly responding to the attack. Furthermore, on some embodiments, the process can include utilizing internet nodes to combat an attack, thus pushing back responsibility to prevent passage of the potentially detrimental DDoS attack signatures.

Figure 1:
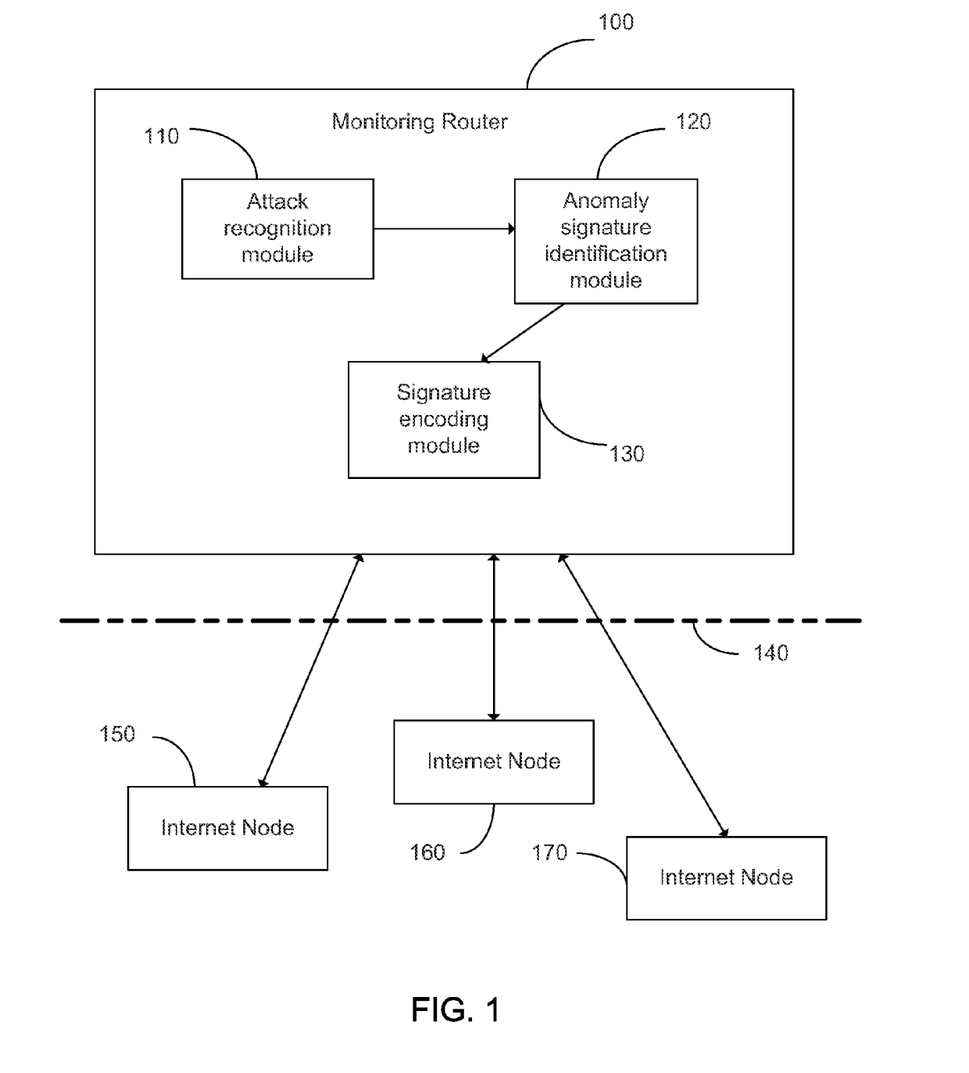
FIG. 1 is a block diagram illustration of system for responding to a DDoS attack wherein the attack recognition module, the anomaly signature identification module, and the signature encoding module are all located in a monitoring router, in accordance with an embodiment of the present invention.

FIG. 1 illustrates such a system for identifying and responding to a DDoS attack. As shown, a monitoring router 100 includes an attack recognition module 110. The attack recognition module can be configured to identify a DDoS attack. There are a number of methods that can be utilized to recognize a DDoS attack, and any method capable of identifying the attack is contemplated herein and occurs at the attack recognition module on the monitoring router.

For example, most routers and other network nodes used in intra-networks or autonomous networks, include network measurement infrastructure including counters that aggregate the number of bytes and the number of packets of each flow that passes through the router. Large enterprises and service provider networks have hundreds of thousands of data flows passing through their network at any point in time. This naturally results in a large number of flow summaries being generated per minute. In one embodiment, the attack recognition module relies on deviations from a flow pattern baseline to identify a DDoS attack initially. Such baselines can be relatively crude overall flow patterns, or can be more detailed. As another non-limiting example, by inspecting flow summaries containing source IP addresses and destination IP addresses, a baseline can be calculated that a particular IP network A sends around 100 MB per hour to IP network B. Similar past measurements in the time-scale of hours or days can be identified. Optionally, multiple baselines can be used simultaneously (for example, overall daily flow and hourly flow). If the monitored flow measurements exceed a given threshold, a trigger is fired indicating a potential DDoS attack. One type of threshold-based technique that can be used is known as time-series analysis. By utilizing thresholding techniques, greater computational resources are conserved until the identification of a potential DDoS attack.

As shown in FIG. 1, the attack recognition module 110 communicates information for the identified potential DDoS attack to the anomaly signature identification module 120. In the embodiment of FIG. 1, the anomaly signature identification module is also located on the monitoring router 100. The anomaly signature identification module can be configured to receive attack data from the attack recognition module and to output an anomaly signature associated with the DDoS attack. Any methodology utilized by the anomaly signature identification module to interpret the attack data and interpolate an anomaly signature for the DDoS attack is contemplated herein. In one embodiment, the attack data includes information including, for example, byte per packet counters, IPV4 next-hop information, border gateway protocol (BGP) next-hop information, transmission control protocol (TCP) field information, multicast packet counts, and other metadata.

The detailed information can be used by the anomaly signature identification module to construct detailed anomaly signatures related to the DDoS attack. For example, a TCP-SYN (transmission control protocol-synchronize packet in transmission) attack can be identified by a spike in flows involving TCP-SYN packets with no matching TCP-FIN packets to a particular destination. For example, if the destination network was 18.1.2.0/24, the anomaly signature matching the attack may be arranged as (*source IP*, 18.1.2.0/24, *source port*, *destination port*, TCP). Wherein the asterisk (*) is used to indicate fields that are not defined and, in the present example, do not matter for the particular anomaly signature. In the above embodiment, it should be noted that the network measurement infrastructure is assumed to include counters that are capable of aggregating the number of bytes and the number of packets of each flow that pass through the router. Networks having the capability of extracting simple network management protocol (SNMP) parameters on commercial network devices can be utilized by the present method. SNMP is a simple request-respond protocol that allows an analysis engine or other portion of the system to query a router or other network node for statistics of interest, such as a total number of packets. Other embodiments are contemplated herein which rely on alternative forms of identifying a DDoS attack and extracting a related DDoS signature.

As shown in FIG. 1, the anomaly signature identification module 120 communicates the anomaly signature to a signature encoding module 130. In the embodiment shown in FIG. 1, the signature encoding module is on the monitoring router 100. The signature encoding module is configured to include the anomaly signature as a payload of an inter-domain routing protocol communication. It should be noted that, as used herein, intra-domain is used to indicate an autonomous system, generally protected and separated from the internet by a firewall (140 of FIG. 4) or similar network protection devices. The terms inter-domain and internet are used to indicate the Internet or other external network, as differentiated from an internal or autonomous network. The inter-domain or internet are generally in communicative access to the intra-domain. Such is generally the case with most networks, wherein information is passed to and from the network and the Internet. As discussed herein, therefore, the intra-domain is not considered part of the internet. The delineation between an intra-network and the internet is generally based on control over aspects of each network. For example, a network administrator has control over various aspects of an intra-network, such as intra-network node communication and programming, router configuration, memory, access, etc. The network administrator, however, does not have control over another domain, or routers belonging to an internet service provider. As such, the other domain and internet service provider routers are considered to be external network.

As noted, the signature encoding module 130 is configured to include the anomaly signature as a payload of an inter-domain routing protocol communication. Such routing protocol communications are typically used for communicating routing protocol information between internet routers. Routing protocol information is generally utilized with dynamic routing wherein a routing table in each router constantly changes according to network traffic and conditions as communicated via the routing protocol. As previously discussed, interior routers utilize different protocols than do exterior or internet routers. Just the same, each network (both interior and exterior) each separately communicate via an appropriate protocol (the information utilized to update dynamic routing tables) which allow a router to effectively and efficiently direct packeted information to the desired destination.

In one embodiment, the inter-domain routing protocol communication can be a packet. In one embodiment, the inter-domain routing protocol communication can be BGP (border gateway protocol). Any communication protocol used by internet routers for inter-router communications that can be modified to include the anomaly signature can be used. MP-BGP, or multi-protocol border gateway protocol, can be, for example, modified to include an anomaly signature(s), and likewise propagate the anomaly signature to other internet routers. Generally, there are two types of routing protocols, which can be classified as interior and exterior. Interior routing protocols are generally used on routers or intra-network nodes within an autonomous network. An example of an interior routing protocol is RIP or routing information protocol. Alternatively, exterior types routing protocols are utilized by routers and internet nodes located on the internet. Such are also identified, herein, as inter-domain routing protocols. Non-limiting examples of inter-domain routing protocol include BGP, MP-BGP, and EGP (exterior gateway protocol). The present methods and systems allow for an interior or network node to encode information in an exterior routing protocol, which can then be recognized by an internet or exterior node. And thus, a mode of communication is established between intra-network nodes and internet nodes.

Once the anomaly signature is included as a payload of an inter-domain routing protocol communication, it can be communicated to an internet node outside the network. Such internet nodes 150, 160, and/or 170 of FIG. 1, are typically outside of a firewall 140. The internet node can be configured to receive the inter-domain routing protocol including the anomaly signature payload. In one embodiment, the internet node may be modified to recognize the anomaly signature. Additionally, the internet node can be configured to utilize the anomaly signature to filter the packets matching the anomaly signature. Filtering the packets can include blocking and/or dropping the identified packets, which match the received signature(s).

Figure 2:
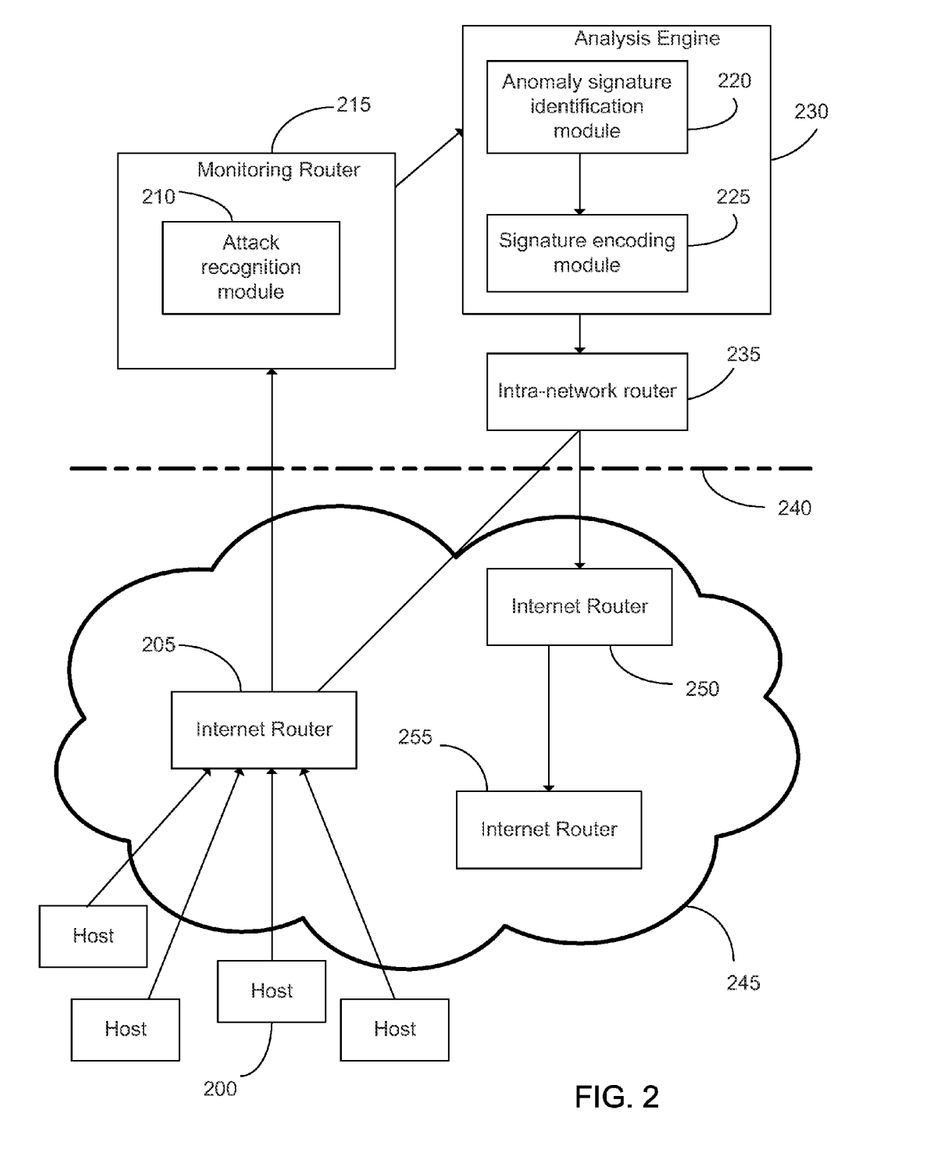
FIG. 2 is a block diagram illustration of a system for responding to a DDoS attack wherein the anomaly signature identification module and the signature encoding module are located in an analysis engine, in accordance with an embodiment of the present invention.

A similar, yet more scalable layered system to the one portrayed in FIG. 1 is shown in FIG. 2. As shown, a DDoS attack is originated from a plurality of host machines 200 through the internet 245. For simplicity, the attack is shown as moving through a single internet router 205, however it should be noted that such an attack generally moves through numerous internet network devices until it reaches the victim or is stopped. The attack moves from the internet to the victim network and arrives at one or more monitoring routers 215 of the network. The monitoring router includes an attack recognition module 210. In the illustrated embodiment, the attack recognition module can recognize an attack and notify the analysis engine 230. The analysis engine includes an anomaly signature identification module 220 and a signature encoding module 225.

As described before, the anomaly signature identification module 220 utilizes the attack data sent from the attack recognition module to identify an anomaly signature. The anomaly signature is received by the signature encoding module 225 and included as a payload of an inter-domain routing protocol communication. The inter-domain routing protocol communication is sent from the signature encoding module on the analysis engine 230 to an intra-network router 235. From the intra-network router, the encoded signature can be transmitted to internet routers 250 and 205 outside of the firewall 240 of the intra-network. In one embodiment, the intra-network router can transmit the encoded signature to an internet border router. The internet routers, as well as the intra-network router, can utilize the anomaly signature to filter like signatures from the flow. Border routers are those routers situated along the periphery of the internet. In one embodiment, the router or routers belong to an internet service provider (ISP). Another term for border routers is edge router. Border or edge routers exist at the periphery of networks. Thus, an intra-network can have one or more border routers. Typically, a border router of the internet communicates information to a border router of an intra-network. The border routers can pass information to the intended destination or to other routers, such as other border routers or core (non-border) routers. In one embodiment, internet border routers can be defined as those routers utilizing or capable of utilizing BGP or a form thereof.

By pushing the information out to the internet network devices, the autonomous network, or intra-network, can shield itself from the attack, and can reduce resources necessary to fend off such an attack. As illustrated in FIG. 2, the internet router 250 can optionally forward the anomaly signature, either encoded as a payload of the inter-domain routing protocol communication, or can alter the information into another readily accessible notification to a subsequent internet router 255.

In one embodiment, the step of applying the DDoS signature to enable the internet nodes to filter packets matching the DDoS signature can be performed by applying the DDoS signature as an access control list (ACL). Further, the ACL can be implemented as rules in tertiary content addressable memory (TCAM) of the internet nodes. In one embodiment, internet nodes, such as internet routers can be modified or otherwise configured to glean the DDoS signatures and apply them as rules in their TCAMs. In one embodiment, the anomaly signature can be included as TLV, or type-length-value, fields when included as payload of an inter-domain routing protocol communication, such can be readily accessible for use in application as an ACL in a TCAM. Once the DDoS is no longer a threat, TCAM can deprogram the DDoS signature. TCAM is a version of CAM (content addressable memory) that allows for a third matching state. CAM is generally used in high-speed search applications. In a simple form, CAM is binary-based. TCAM, then, allows for wild card place holders in the matching fields, and as such, introduces a significant amount of flexibility to the search. Various methods are known in the art to load information to TCAM.

It should be noted that the embodiments portrayed by the figures are simplified and that the illustrated systems can be scaled appropriately for any system concerned with a DDoS attack. In a more practical setting for scalable networks, for example, there can be a plurality of attack recognition modules, anomaly signature identification modules, monitoring routers, analysis engines, etc. In such embodiments, it can be beneficial to pool all of the information in a common location. Alternatively, it can be beneficial to disperse the resources out over the intra-network. For example, data from a plurality of border routers for an intra-network can be communicated to a monitoring router. Alternatively, each border router can function as a monitoring router and include separate attack recognition modules. Once an attack is identified, for example, the attack notification and data can be sent to a common anomaly signature identification module, or can be sent to the nearest of many anomaly signature identification module. The signature encoding module, as shown by the figures, can be on the monitoring router or can be on an analysis engine. Alternatively, the signature encoding module can be apart from the attack recognition module and/or the anomaly signature identification module. It can be placed for example, on an encoding engine, a separate analysis engine, a border router, a separate monitoring router, etc.

Figure 3:
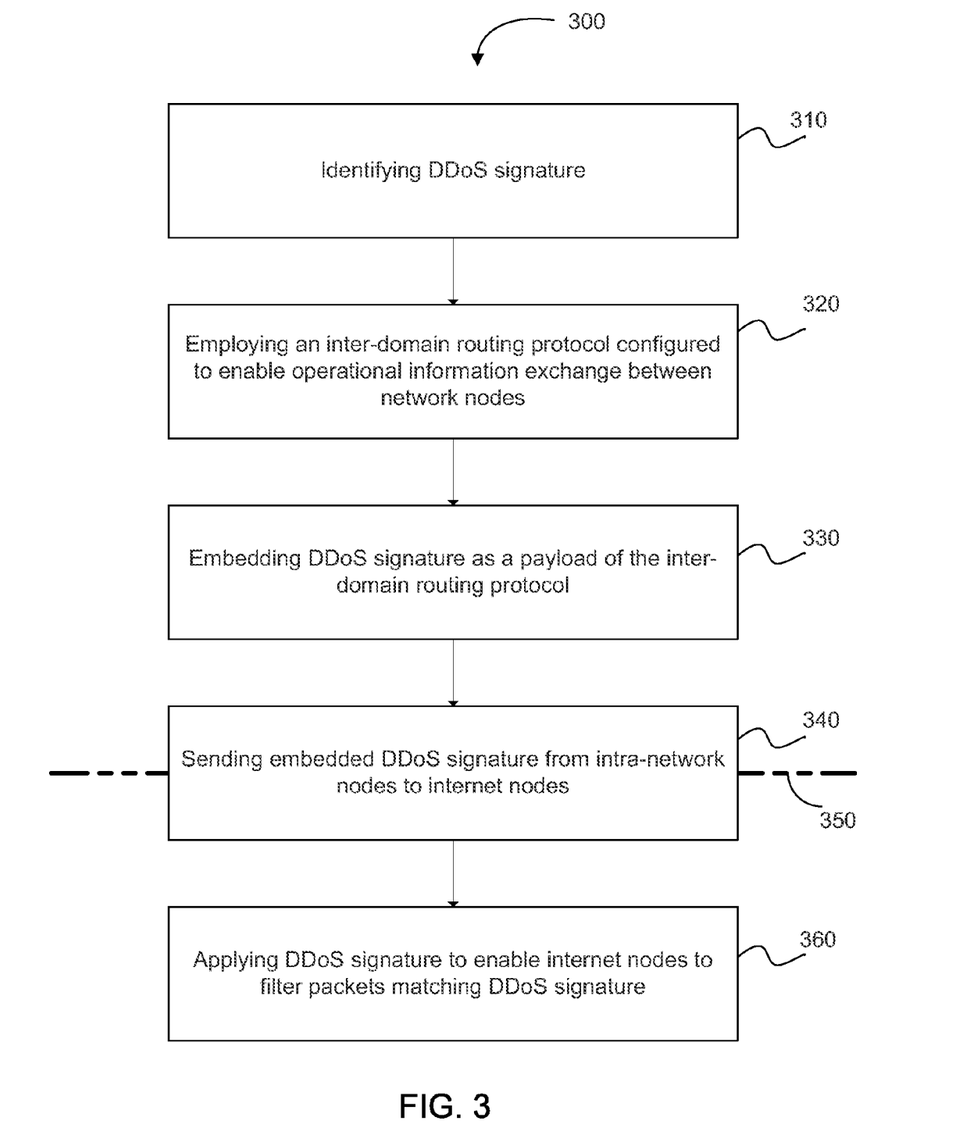
FIG. 3 is a flow chart of a method of transmitting a DDoS signature from an intra-network to an internet, in accordance with an embodiment of the present invention.

Utilizing the system discussed herein, DDoS anomaly signatures can be communicated outside of intra-networks. FIG. 3 presents a method 300 of transmitting a DDoS signature from an intra-network to an internet. The method includes identifying a DDoS signature 310 and employing an inter-domain routing protocol configured to enable operational information exchange between network nodes 320. The DDoS signature is embedded as a payload of the standards-compliant inter-domain routing protocol 330. The step of embedding occurs within an intra-network. The embedded DDoS signature is then sent from the embedding site to internet nodes outside of the network 340. Such transmission from an intra-network to an internet is signified by the dotted crossing line 350 of FIG. 3. The method further includes applying the DDoS signature to enable the internet nodes to filter packets matching the DDoS signature 360.

In one embodiment, it may be useful or necessary to modify at least one of the internetwork nodes to recognize and/or utilize the embedded DDoS signature. As previously noted, in one embodiment, the inter-domain routing protocol can be BGP, or a variation thereof. Once received by an internet node, such as, e.g., an internet router, the DDoS signature can be further communicated to additional internet nodes. Such additional communication can rely on the inter-domain routing protocol, or can utilize another communication protocol. In one embodiment, the communication between internet routers can rely on IBGP full-mesh configuration.

Figure 4:
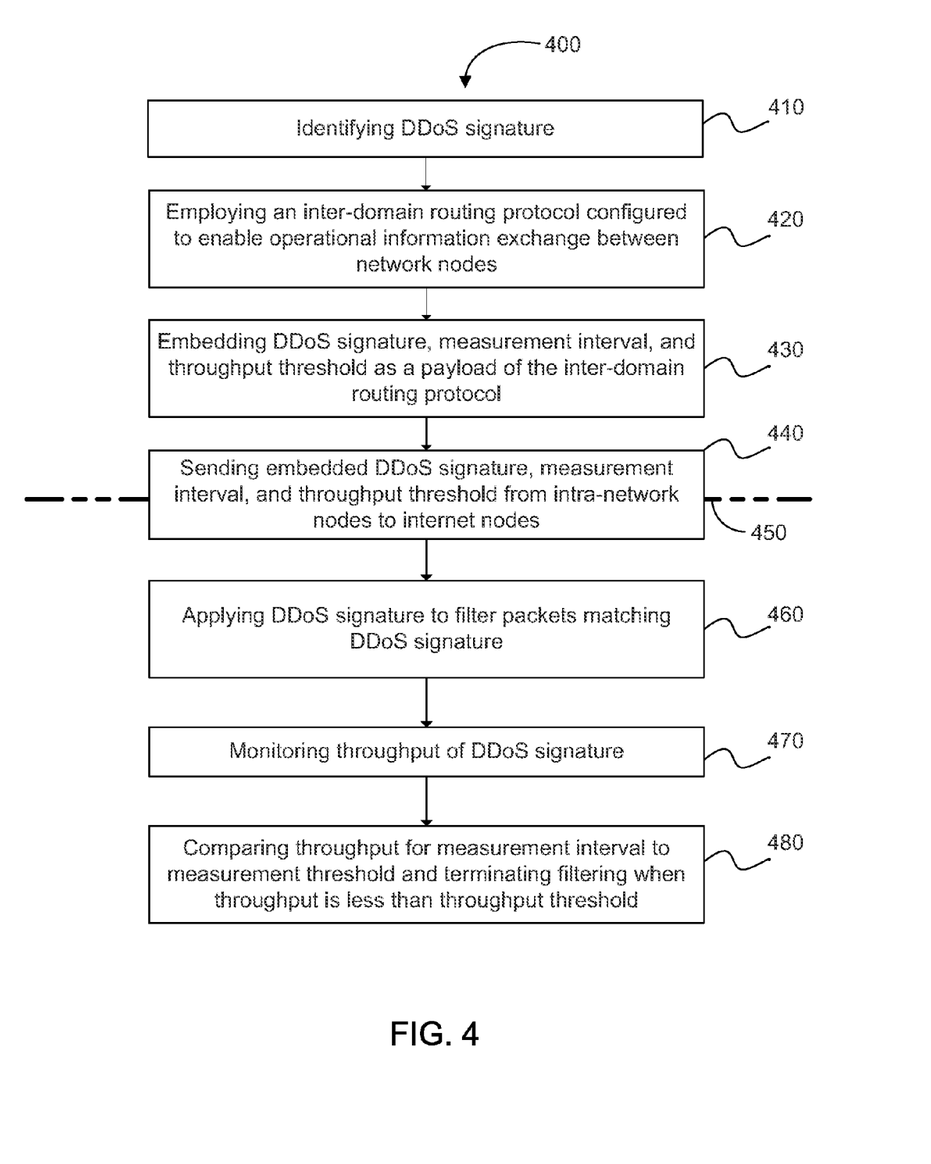
FIG. 4 is a flow chart of a method of transmitting a DDoS signature, a measurement interval, and a throughput threshold from an intra-network to an internet, in accordance with an embodiment of the present invention.

Considering that a DDoS attack rarely if ever continues indefinitely, it can be useful to optionally include in the method operation which can halt the monitoring for the particular DDoS signature. As illustrated in FIG. 4, in one embodiment, a method 400 for transmitting a DDoS signature from an intra-network to an internet can include identifying a DDoS signature 410. The initial steps are similar to those in FIG. 3, and include employing an inter-domain routing protocol configured to enable operational information exchange between network nodes 420. A DDoS signature can be embedded as a payload of the inter-domain routing protocol 430. Additionally, a measurement interval and a throughput threshold related to the measurement interval for the DDoS signature use can be included as the payload of the inter-domain routing protocol 430. The embedded DDoS signature, measurement interval, and throughput threshold can be sent from intra-network nodes to internet nodes 440, effectively crossing the boundary from the intra-network to the internet, as signified by crossing line 450. Next, the method can include applying the DDoS signature to filter packets matching the DDoS signature 460.

After and/or along with applying the DDoS signature to filter packets, the throughput of the DDoS signature can be monitored 470. The level of throughput can be compared to the defined throughput threshold for a given measurement interval, and when the throughput is less than the threshold defined, the use of the DDoS signature to filter packets can be terminated 480. Further, the internet node can eliminate the DDoS signature, throughput threshold, and measurement interval from its resources, if desired. In one aspect, the forwarded threshold can be a divided threshold sent to peer nodes from which the node receives traffic. The division can be proportional, i.e. according to their corresponding traffic rates. There are a number of methods known to those skilled in the art to distribute a threshold among peer nodes (e.g. proportional to the traffic they generate), and any currently known or later developed methods can be utilized herein.

In a further optional embodiment, a signature withdrawal message can be formed and propagated by the internet node or intra-network node that first has cause to terminate use of the DDoS anomaly signature. In the embodiment exemplified in FIG. 4, when the throughput of the DDoS signature for the measurement interval is less than the throughput threshold and filtering is terminated 480, the internet node can at that point propagate a withdrawal message to other internet nodes. Internet nodes receiving the withdrawal message can optionally immediately terminate use of the DDoS anomaly signature. In one embodiment, the withdrawal message can be configured to re-trace the path of the DDoS signature meaning that once a withdrawal message is appropriate, it is sent only to the source of the DDoS signature. Therefore, if the DDoS signature was sent from internet node A to internet node B to internet node C, and internet node C has cause for a withdrawal message, it can be propagated from internet node C to internet node B and from internet node B to internet node A. This may allow a centralized termination decision to be made. In certain embodiments, there may be a concern for cascaded withdrawals following immediately after a DDoS attack ceases. In such cases, randomized measurement interval times can be utilized rather than standardized measurement intervals. Such measurement intervals can based within a defined time range.

In one embodiment, within an intra-network a DDoS attack can be recognized, and an anomaly signature can be identified. The anomaly signature can be sent to border routers within the intra-network. Generally, this communication can utilize an intra-network router protocol. The signature can further be included as a payload of an inter-domain routing protocol, and sent to internet border routers. With each receiving router, the anomaly signature can be extracted and installed as ACLs using TCAM that in turn propagate the anomaly signature to additional routers as well as filtering by blocking and/or dropping packets matching the anomaly signature. This can be done using several mechanisms such as using open shortest path first opaque link-state advertisements (OSPF opaque LSA types). In such a model, the opaque LSAs can be populated with type length value (TLV) fields that in turn comprise the anomaly detection pattern across the network and can be discarded by all but OSPF autonomous system border routers (ASBR) and area border routers (ABR). ABRs and ASBRs are border routers for on a per OSPF-domain and per-internet domain respectively. The ABRs and ASBRs can install these ACLs to prevent disruption due to flows arising from different areas or autonomous systems, respectively.

Throughout the discussion, one or more of the internet nodes can be a router. In one embodiment, the router can be a border router. Other nodes, such as engines, servers, etc. are also contemplated herein.

The method and system presented herein allow partial to complete automation, if desired. A DDoS attack can be identified and mitigated without the input, review, or approval of a user. Alternatively, checks and/or approvals can be established within the system and method that encourage user input. For example, once a DDoS attack is identified, approval may be required before an embedded DDoS signature is sent outside of the intra-network. The method presented herein is easily scalable to any size of intra-domain, and therefore, has broad-range applicability. The communication methods utilized, the inter-domain routing protocol, is the preferred and/or common protocol for communication amongst routers, and therefore, any routers utilized, and therefore, the infrastructure of the internet, would not need to be replaced to utilized the disclosed system and method.

The present method and system allows for effective communication from an intra-network to internet nodes, such as internet routers. By allowing such communication, an anomaly signature for a DDoS attack can be communicated outside of an intra-network. The anomaly signature can then be used by internet nodes to prevent the DDoS attack from reaching the intended intra-network. When internet nodes are utilized to counter a DDoS attack, the attack is rendered ineffective, and it no longer results in denial of service for the intended victim. In addition, the intended victim does not necessarily have to allot bandwidth or processing resources to monitoring and fending off the attack, as filtering functions are occurring on an internet level.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of transmitting a distributed denial of service (DDoS) signature from an intra-network to an internet, comprising:
    identifying a DDoS signature using a network node within an intra-network;
    employing an inter-domain routing protocol to enable operational information to be exchanged between network nodes;
    embedding the DDoS signature and a throughput threshold as a payload of the inter-domain routing protocol, wherein the embedding occurs within the intra-network; and
    sending the embedded DDoS signature and throughput threshold from the intra-network to an internet node,
    wherein the DDoS signature is to be used by the internet node to filter packets matching the DDoS signature, and
    wherein the throughput threshold is to be used by the internet node to terminate the use of the DDoS signature when a throughput of the DDoS signature is less than the throughput threshold for a measurement interval.

2. The method of claim 1, wherein the internet node is modified to recognize the embedded DDoS signature.

3. The method of claim 1, wherein the inter-domain routing protocol is Border Gateway Protocol (BGP).

4. The method of claim 1, wherein the internet node sends the DDoS signature to additional internet nodes using the inter-domain routing protocol.

5. The method of claim 1, further comprising:
    embedding the measurement interval as a payload of the inter-domain routing protocol; and
    sending the embedded measurement interval from the intra-network to the internet node.

6. The method of claim 1, further comprising:
    applying the DDoS signature to enable the internet node to filter packets matching the DDoS signature;
    monitoring a throughput of the DDoS signature at the internet node;
    comparing the throughput of the DDoS signature and the throughput threshold for the measurement interval; and
    terminating filtering of packets matching the DDoS signature when the throughput of the DDoS signature is less than the throughput threshold for the measurement interval at the internet node.

7. The method of claim 6, further comprising propagating a signature withdrawal message from the internet node if the throughput of the DDoS signature is less than the throughput threshold for the measurement interval.

8. The method of claim 1, wherein at least one of the network nodes within the intra-network is a router.

9. The method of claim 8, wherein the router is a border router.

10. The method of claim 6, wherein applying the DDoS signature to enable the internet nodes to filter packets matching the DDoS signature includes applying the DDoS signature as an access control list (ACL).

11. The method of claim 10, wherein the access control list (ACL) is implemented as rules in tertiary content addressable memory (TCAM) of the internet node.

12. A method of transmitting a distributed denial of service (DDoS) signature from an intra-network to an internet, comprising:
    identifying a DDoS signature using a network node within an intra-network;
    employing an inter-domain routing protocol configured to enable operational information to be exchanged between network nodes;
    embedding the DDoS signature and a throughput threshold as a payload of the inter-domain routing protocol, wherein the embedding occurs within the intra-network;
    sending the embedded DDoS signature and throughput threshold from the intra-network to an internet node;
    applying the DDoS signature to enable the internet node to filter packets matching the DDoS signature;
    monitoring a throughput of the DDoS signature at the internet node for a measurement interval;
    comparing the throughput of the DDoS signature to the throughput threshold; and
    terminating filtering of packets matching the DDoS signature when the throughput of the DDoS signature is less than the throughput threshold for the measurement interval at the internet node.

13. A system for responding to a distributed denial of service (DDoS) attack, comprising: a device in an intra-network, the device including a processor and a memory, the memory storing instructions which when executed by the processor cause the device to:
    identify attack data;
    output an anomaly signature associated with the DDoS attack in response to the attack data; and
    embed the anomaly signature and a throughput threshold as a payload of an inter-domain routing protocol communication and send the embedded anomaly signature and throughput threshold to an internet node,
    wherein the anomaly signature is to be used by the internet node to filter packets, and
    wherein the throughput threshold is to be used by the internet node to terminate the use of the anomaly signature when a throughput of the anomaly signature is less than the throughput threshold for a measurement interval.

14. The system of claim 13, wherein the internet node is outside the network to receive an inter-domain routing protocol packet including the embedded anomaly signature, wherein the internet node is to utilize the anomaly signature to block or drop packets matching the anomaly signature.

15. The system of claim 13, wherein inter-domain routing protocol is Border Gateway Protocol (BGP).

16. The system of claim 13, wherein the device is a monitoring router.

17. The system of claim 14, wherein the internet node outside the intra-network is modified to recognize the anomaly signature.

18. The system of claim 13, further comprising a router in the intra-network to receive the embedded anomaly signature and transmit the embedded anomaly signature to the internet node outside the network.

19. The system of claim 14, wherein the internet node outside the network is a border router.

* * * * *